United States Patent
Liang et al.

(10) Patent No.: US 8,837,576 B2
(45) Date of Patent: Sep. 16, 2014

(54) CAMERA PARAMETER-ASSISTED VIDEO ENCODING

(75) Inventors: Liang Liang, San Diego, CA (US); Szepo R. Hung, San Diego, CA (US); Ruben M. Velarde, San Diego, CA (US); Ying X. Noyes, San Diego, CA (US); Haiyin Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 936 days.

(21) Appl. No.: 12/774,467

(22) Filed: May 5, 2010

(65) Prior Publication Data

US 2011/0109758 A1  May 12, 2011

Related U.S. Application Data

(60) Provisional application No. 61/258,913, filed on Nov. 6, 2009.

(51) Int. Cl.
*H04N 21/44* (2011.01)
*H04N 9/28* (2006.01)
*H04N 9/73* (2006.01)
*H04N 19/107* (2014.01)
*H04N 19/179* (2014.01)
*H04N 19/142* (2014.01)
*H04N 19/46* (2014.01)
*H04N 5/351* (2011.01)

(52) U.S. Cl.
CPC ..... *H04N 19/00163* (2013.01); *H04N 19/0003* (2013.01); *H04N 19/0029* (2013.01); *H04N 19/00545* (2013.01)
USPC ...... 375/240; 348/222.1; 348/223.1; 348/345; 348/349; 348/353; 348/E5.067

(58) Field of Classification Search
USPC .......... 348/222.1, 223.1, 345, 349, 353, 348/E5.067; 375/240
See application file for complete search history.

(56) References Cited

U.S. PATENT DOCUMENTS 5,576,767 A    11/1996  Lee et al.
5,877,809 A *  3/1999   Omata et al. ........... 348/345

(Continued)

FOREIGN PATENT DOCUMENTS

JP    2006121224 A    5/2006
JP    2006197005 A    7/2006

(Continued)

OTHER PUBLICATIONS

J. Korpi-Anttila, "Automatic Colour Enchancement and Scene Change Detection of Digital Video", 32 Graphic Arts in Finland 1-10 (Apr. 2003).*

(Continued)

*Primary Examiner* — Dave Czekaj
*Assistant Examiner* — David N Werner
(74) *Attorney, Agent, or Firm* — Espartaco Diaz Hidalgo

(57) ABSTRACT

This disclosure describes techniques for improving functionalities of a back-end device, e.g., a video encoder, using parameters detected by a front-end device, e.g., a video camera. The techniques may involve detecting a scene change in a captured frame, based on one or more parameters of auto exposure (AE), auto white balance (AWB), and auto focus (AF) functions. If a scene change is detected in a captured frame, a video processing device, which may be a stand-alone device, or may be integrated into one of the front-end or back-end devices, provides an indication of the scene change. The video encoder interprets the signal as a trigger to encode the frame indicated as the frame where a scene change occurred as a reference I frame.

35 Claims, 8 Drawing Sheets

(56) References Cited

U.S. PATENT DOCUMENTS

| | | | |
|---|---|---|---|
| 6,078,726 A * | 6/2000 | Gotoh et al. | 386/239 |
| 6,704,045 B1 * | 3/2004 | Brett | 348/222.1 |
| 6,822,758 B1 | 11/2004 | Morino | |
| 7,071,974 B2 * | 7/2006 | Tojo | 348/222.1 |
| 7,084,909 B2 | 8/2006 | Yamasaki | |
| 7,304,681 B2 * | 12/2007 | Larner et al. | 348/352 |
| 7,409,144 B2 * | 8/2008 | McGrath et al. | 386/248 |
| 7,463,755 B2 | 12/2008 | Duan | |
| 7,495,692 B2 | 2/2009 | Tanaka et al. | |
| 7,528,883 B2 | 5/2009 | Hsu | |
| 7,573,305 B1 * | 8/2009 | Cosand et al. | 327/117 |
| 7,720,148 B2 | 5/2010 | Au et al. | |
| 8,094,714 B2 | 1/2012 | Nakazato et al. | |
| 2002/0196362 A1 | 12/2002 | Yang et al. | |
| 2004/0179593 A1 | 9/2004 | Goldstein et al. | |
| 2006/0029265 A1 | 2/2006 | Kim et al. | |
| 2006/0039471 A1 | 2/2006 | Dane et al. | |
| 2006/0083299 A1 | 4/2006 | Kitajima | |
| 2006/0171569 A1 | 8/2006 | Budagavi | |
| 2006/0202945 A1 | 9/2006 | Feng | |
| 2006/0232697 A1 | 10/2006 | Ito et al. | |
| 2006/0238641 A1 * | 10/2006 | Konishi | 348/349 |
| 2007/0030381 A1 | 2/2007 | Maeda | |
| 2007/0040917 A1 | 2/2007 | Kobayashi | |
| 2007/0070250 A1 | 3/2007 | Zhou et al. | |
| 2007/0171973 A1 | 7/2007 | Kobayashi | |
| 2007/0189386 A1 | 8/2007 | Imagawa et al. | |
| 2008/0084506 A1 | 4/2008 | Bazin et al. | |
| 2008/0123747 A1 | 5/2008 | Lee et al. | |
| 2008/0143883 A1 * | 6/2008 | Hsuan | 348/687 |
| 2008/0278601 A1 * | 11/2008 | Goel et al. | 348/223.1 |
| 2009/0051783 A1 | 2/2009 | Kim et al. | |
| 2009/0060373 A1 | 3/2009 | Perera et al. | |
| 2009/0074396 A1 | 3/2009 | Park et al. | |
| 2009/0207234 A1 | 8/2009 | Chen et al. | |
| 2009/0244319 A1 | 10/2009 | Kim et al. | |
| 2009/0262233 A1 * | 10/2009 | Nagahata et al. | 348/341 |
| 2010/0086035 A1 | 4/2010 | Park et al. | |
| 2010/0278231 A1 | 11/2010 | Gutman et al. | |
| 2011/0110420 A1 | 5/2011 | Liang et al. | |
| 2011/0150366 A1 | 6/2011 | Yoda | |
| 2011/0292997 A1 | 12/2011 | An et al. | |

FOREIGN PATENT DOCUMENTS

| | | |
|---|---|---|
| JP | 2008160189 A | 7/2008 |
| WO | WO0201488 A1 | 1/2002 |
| WO | 2006023789 | 3/2006 |
| WO | WO2006094033 A1 | 9/2006 |
| WO | 20070142646 A1 | 12/2007 |
| WO | WO2009017138 A1 | 2/2009 |
| WO | WO2009088976 A1 | 7/2009 |
| WO | 2009107849 A1 | 9/2009 |

OTHER PUBLICATIONS

J. Lee & B.W. Dickinson, "Temporally Adaptive Motion Interpolation Exploiting Temporal Masking in Visual Perception", 3 IEEE Transactions on Image Processing 513-526 (Sep. 1994).*

G.E. Blelloch, "Introduction to Data Compression", Carnegie Mellon University, Jan. 31, 2013.*

Budagavi M: "Video Compression using Blur Compensation", Image Processing, 2005, ICIP 2005, vol. 2, Sep. 11, 2005, pp. 882-885, XP010851195, DOI:10.1109/ICIP.2005.1530197 ISBN: 978-0-7803-9134-5.

International Search Report and Written Opinion—PCT/US2010/054149, ISA/EPO—May 6, 2011.

Ribas-Corbera Jordi et al., "Optimal motion vector accuracy for block-based motion-compensated video coders", Proceedings of SPIE, SPIE, USA, vol. 2668, Jan. 1, 1996, pp. 302-314, XP002336827, ISSN: 0277-786X, DOI:10.1117/12.235425.

Wiegand T et al: "Overview of the H.264/AVC video coding standard", IEEE Transactions on Circuits and Systems for Video Technology, IEEE Service Center, Piscataway, NJ, US, vol. 13, No. 7, Jul. 1, 2003, pp. 560-576, XP011221093, ISSN: 1051-8215, DOI: DOI:10.1109/TCSVT.2003.815165.

Cheolhong AN: "Motion blur adaptive Rate Control", 2010 44th Asilomar Conference on Signals, Systems and Computers—Nov. 7-10, 2010—Pacific Grove, CA, USA, IEEE, Piscataway, NJ, USA, Nov. 7, 2010, pp. 426-429, XP031860650, DOI: 10.1109/ACSSC.2010.5757593 ISBN: 978-1-4244-9722-5.

Gokstorp M: "Computing depth from out-of-focus blur using a local frequency representation" Pattern Recognition, 1994. vol. 1, Conference A: Computer Vision & Image Processing, Proceedings of the 12th IAPR International Conference on Jerusalem, Israel Oct. 9-13, 1994, Los Alamitos, CA, USA,IEEE Comput. Soc, vol. 1, Oct. 9, 1994, pp. 153-158, XP010215959 ISBN: 978-0-8186-6265-2 * abstract, Figure 5, sections 1-2, equation (7) *.

* cited by examiner

| Y(1,1) | Y(1,2) | ..... | ..... | ..... | Y(1,M) |
|---|---|---|---|---|---|
| Y(2,1) | Y(2,2) | ..... | ..... | ..... | Y(2,M) |
| . . | | | | | . . |
| . . | | | | | . . |
| . . | | | | | . . |
| Y(N,1) | Y(N,2) | ..... | ..... | ..... | Y(N,M) |

FIG. 3B

CAMERA PARAMETER-ASSISTED VIDEO ENCODING

This application claims the benefit of U.S. Provisional Application 61/258,913, filed on Nov. 6, 2009, the entire content of which is incorporated herein by reference.

TECHNICAL FIELD

The disclosure relates to video encoding.

BACKGROUND

Digital multimedia capabilities can be incorporated into a wide range of devices, including digital televisions, digital direct broadcast systems, wireless communication devices, wireless broadcast systems, personal digital assistants (PDAs), laptop or desktop computers, digital cameras, digital recording devices, video gaming devices, video game consoles, cellular or satellite radio telephones, digital media players, and the like. Digital multimedia devices may implement video coding techniques, such as MPEG-2, ITU-H.263, MPEG-4, or ITU-H.264/MPEG-4 Part 10, Advanced Video Coding (AVC), to transmit and receive or store and retrieve digital video data more efficiently. Video encoding techniques may perform video compression via spatial and temporal prediction to reduce or remove redundancy inherent in video sequences.

A video capture device, e.g., video camera, captures a video stream and sends it to a video encoder for encoding. The video encoder processes the video stream, encodes the processed video stream, and transmits the encoded video data for storage or decoding and display. The available bandwidth for storing or transmitting the video is often limited and is affected by factors such as the video encoding data rate.

Several factors contribute to the video encoding data rate. Therefore, when designing video encoders, one of the concerns is improving the video encoding data rate. Generally, improvements are implemented in the video encoder and often add extra computation complexity to the video encoder, which can offset some of the benefits of an improved video encoding data rate.

SUMMARY

This disclosure describes techniques for controlling video encoding based on one or more parameters associated with a video capture device. Using parameters associated with a video capture device, a video encoding device may promote video quality while reducing computational overhead in the video encoding device.

The parameters associated with the video capture device may be obtained by the video capture device, e.g., a video camera, during the capturing of video frames. Based on the parameters, the video capture device or video encoding device may make one or more determinations regarding the content of the captured video frames, and control the video encoding process based on the determinations.

In this manner, the video encoding process may be controlled based on parameters that are already determined during the video frame capturing process, such as, for example, parameters associated with auto exposure control, auto white balance, and auto focus functions of the video capture device. Using one or more of these parameters, the video capture device or video encoding device may determine whether a scene change has occurred in a captured frame. If a scene change is detected, the video capture device or video encoding device may selectively cause the corresponding frame to be encoded as a reference frame.

In one example, this disclosure describes a method comprising obtaining one or more video capture parameters associated with captured video frames, detecting a scene change in the captured video frames based on the one or more video capture parameters, and encoding the captured video frames based on the detected scene change.

In another example, this disclosure describes a device comprising a video capture device that obtains one or more video capture parameters associated with captured video frames, a processor that detects a scene change in the captured video frames based on the obtained one or more video capture parameters, and a video encoding device that encodes the captured video frames based on the detected scene change.

In another example, this disclosure describes a computer-readable medium comprising instructions for causing a programmable processor to obtain one or more video capture parameters associated with captured video frames, detect a scene change in the captured video frames based on the obtained one or more video capture parameters, and encode the captured video frames based on the detected scene change.

In another example, this disclosure describes a device comprising means for obtaining one or more video capture parameters associated with captured video frames, means for detecting a scene change in the captured video frames based on the obtained one or more video capture parameters, and means for encoding the captured video frames based on the detected scene change.

The techniques described in this disclosure may be implemented in hardware, software, firmware, or any combination thereof. If implemented in software, the software may be executed in one or more processors, such as a microprocessor, application specific integrated circuit (ASIC), field programmable gate array (FPGA), or digital signal processor (DSP). The software that executes the techniques may be initially stored in a computer-readable medium and loaded and executed in the processor.

Accordingly, this disclosure also contemplates a computer-readable storage medium comprising instructions that upon execution by a processor cause the processor to obtain one or more video capture parameters associated with captured video frames, detect a scene change in the captured video frames based on the one or more video capture parameters, and encode the captured video frames based on the detected scene change.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF DRAWINGS

FIG. 3B illustrates a N×M block of luma values of pixels of a captured video frame.

DETAILED DESCRIPTION

This disclosure describes techniques for obtaining one or more video capture parameters associated with a video capture device and using the obtained video capture parameters to control a video encoding process. The obtained video capture parameters may be, for example, parameters associated with auto exposure control (AE), auto focus (AF), and auto white balance (AWB). A video processing device, e.g., a video capture device or a video encoding device, may use the obtained video capture parameters to make a determination regarding content of captured video frames, such as, whether a scene change has occurred in the captured video frames. The video encoding device may control the encoding process based on the determination regarding the content of the captured video frames. In one example, controlling the encoding process may involve encoding one of the captured video frames as a reference frame. In this manner, controlling the encoding process uses parameters that are already determined during video capturing, which promotes video quality while reducing computational overhead in the video encoding device.

Figure 1:
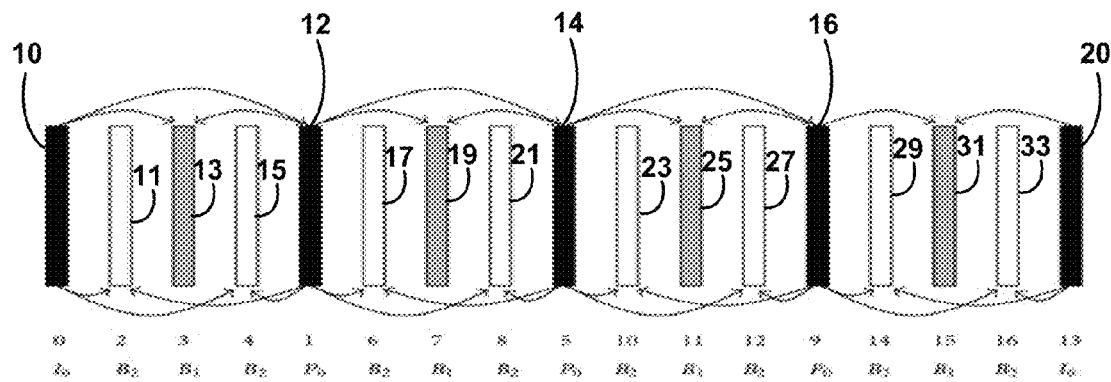
FIG. 1 illustrates an exemplary group of pictures (GOP) in inter-frame prediction.

FIG. 1 illustrates an exemplary group of pictures (GOP), which may be utilized in inter-frame prediction. In video encoding, a sequence of frames may capture the same scene, with some changes, such that it may be more efficient to encode the frames, or GOP, using inter-frame prediction. In inter-frame prediction, the differences between frames or between blocks in the frames may be encoded. For purposes of inter-frame prediction, frames of a GOP may be categorized as I frames (e.g., pictures 10 and 20), P frames (e.g., pictures 12, 14, and 16), or B frames (e.g., pictures 11, 13, 15, 17, 19, 21, 23, 25, 27, 29, 31, and 33), where I and P frames are used as reference frames. A video encoding device may utilize spatial prediction to encode a reference I frame, whereas the video encoding device may encode P or B frames using temporal and/or spatial prediction from reference frames, which may be previously encoded I or P frames. When a scene change occurs, e.g., at a scene cut, when a new object comes into focus, when the light temperature changes, or when the frame brightness level changes, continuously using information from previously encoded frames may not result in an accurate and efficient prediction of the current frame to be encoded.

As a result, when a scene change occurs in a captured video, encoding of a reference I frame may be triggered. The resulting I frame at the scene change boundary may then be used as a reference frame for the following GOP by the video encoding device. A video encoding device may implement algorithms that determine when a scene changes occurs based on analysis of video frame data, and trigger encoding of a new reference I frame instead of P or B frame at the scene change boundary. However, scene detection algorithms implemented in the video encoding device may require significant computational overhead, possibly causing delays and adding computational complexity to the encoding process.

Techniques of this disclosure may include controlling a video encoding process based on parameters associated with a video capture device. The video capture device may obtain the parameters while capturing video frames. A video encoding device may implement a video encoding process to encode the captured video frames. Controlling the video encoding process may involve making a determination regarding the content of the capture video frames based on one or more of the obtained parameters. A video processing device (e.g., the video capture device, the video encoding device, or another device with a processor) may perform the determination substantially in real-time. In one example, the determination may indicate a scene change in the captured frames, and trigger the video encoding device to encode a new reference frame for a new GOP, i.e., a new reference I frame. In one example, the obtained parameters may include parameter values associated with one or more video capture device functions, such as AE, AWB, and AF functions performed by the video capture device, which may be referred to as camera functions. In one example, the video processing device making the determination may determine whether a scene change has occurred based on each of the individual camera function parameters, or may combine the determinations based on each of the characteristics to derive a combined decision, as will be discussed in more detail below.

In one example, if the video processing device determines that a scene change has occurred, the video processing device may send a signal to the video encoding device indicating the captured video frame where scene change is detected, i.e., an initial frame in a new scene. Therefore, it may not be necessary for the video encoding device to perform additional processing of the captured video frames to determine whether a scene change has occurred. The video encoding device may use the scene change indication it receives from the video processing device as a trigger to generate a reference frame, e.g., a reference I frame for a new GOP. In one aspect of this disclosure, the video encoding device may reduce or eliminate additional computational complexity by using information obtained by the video capture device, e.g., the obtained parameters.

Aspects of this disclosure may be utilized in any of a variety of recording and encoding devices. For purposes of this discussion, a video camera is used as an exemplary video capture device. However, it should be understood that aspects of this disclosure may be implemented by a variety of devices and systems that have an image or video capture component and an image or video encoding component, among other components.

Figure 2:
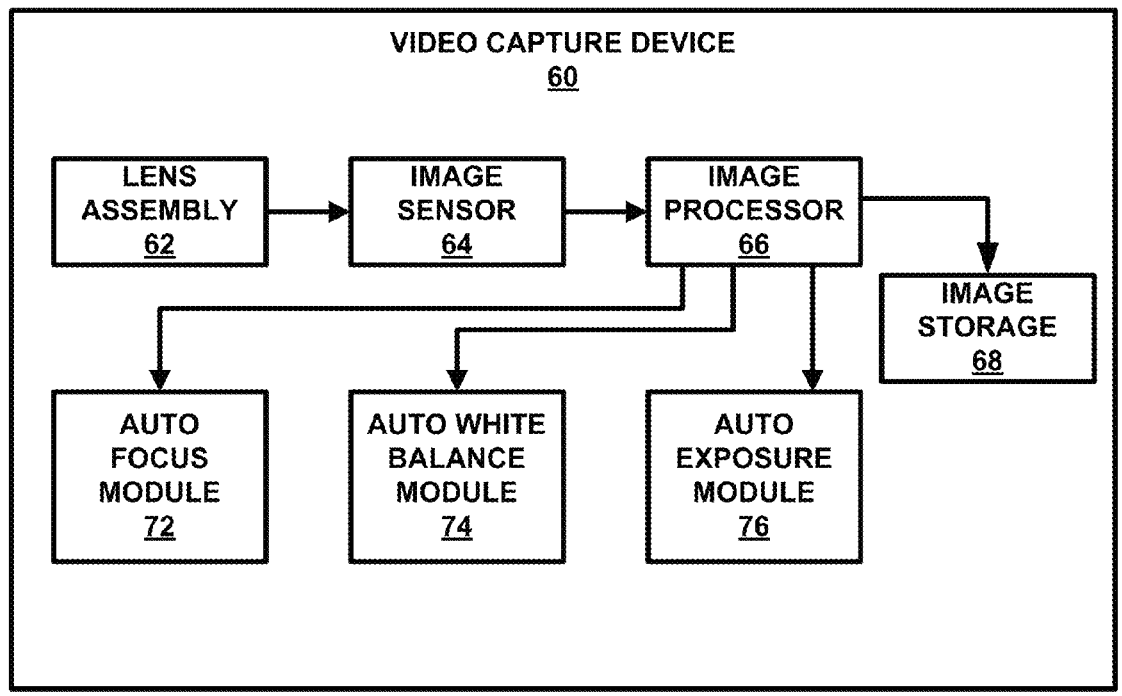
FIG. 2 is a block diagram illustrating an exemplary video capture device.

FIG. 2 is a block diagram illustrating an exemplary image capture device 60. Image capture device 60 may comprise lens assembly 61, image sensor 64, image processor 66, and several modules such as, for example, AF module 72, AWB module 74, and AE module 76. Image capture device 60 may include a digital camera such as, for example, a digital video camera, a digital still camera, or a combination of both. Image capture device 60 may form part of another device that incorporates a still or video camera, such as a wireless communication device handset, a mobile device, or the like. In some aspects, image capture device 60 may also include a microphone to capture audio. Image processor 66 may be a video front end (VFE) image processor.

Lens assembly 62 may include one or more lenses and may be controlled by lens actuators that move the lens in lens assembly 62 among a plurality of different lens positions to focus the lens for capturing a scene. Image sensor 64 may include image sensor elements such as, for example, a charge coupled device (CCD) array or other image sensing device that receives light via the lens and generates image data in response to the received image. Image sensor 64 obtains image information for the scene that image capture device 60 is capturing. Image processor 66 processes the image information and stores the image information in image storage device 68. Image sensor 64 may also obtain image information for the scene being captured for use in functions such as, AF, AWB, and AE functions. Image processor 66 utilizes the image information for preliminary processing for the AF, AWB, and AE functions.

In one example, image processor 66 may control AF module 72 to initiate an auto focus process based on the image information from image sensor 64. During video recording, changes within a scene that a video capture device is capturing may trigger the AF function to refocus. The AF function may involve calculating focus values at several lens positions and selecting a lens position with the maximum focus value for a current scene, which may correspond to a maximum image sharpness value. AF module 72 may determine image sharpness based on analysis of pixel contrast values within the image information obtained by image sensor 64. AF module 72 may provide an indication when a frame is being captured during a refocus process. During the refocus process, AF module 72 may provide information associated with a captured frame such as, for example, the focus value and the lens position. In one example, when the refocus process is triggered, AF module 72 may keep track of the lens position at the beginning of the refocus process and the lens position when refocus is achieved.

In one example, image information that image sensor 64 obtains may include AWB and AE data, which may indicate information regarding environmental color, illumination, and luminance characteristics. AWB module 74 may obtain and analyze raw image information obtained by image sensor 64. AWB module 74 may output an indication of the environment of the scene based on the analyzed image information. For example, if the image information indicates illuminant color characteristics and/or intensities consistent with an indoor environment, AWB module 74 may output an indication of an indoor environment. In one example, AWB module 74 may output a grey world decision for each captured frame. The AWB grey world decision may be based on grey world assumption, which states that, in a given image, the average values of the RGB components of the image should average to a common grey value. Based on the determined grey value, AWB module 74 may classify the image into a category or a cluster. For example, in a given system, there may be three grey world categories or clusters: an outdoor cluster, an indoor cluster, and a horizon cluster. The clusters may be organized based on color temperature within the frame. AWB module 74 may indicate the category or cluster associated with each captured frame.

AE module 76 may obtain and analyze the raw image information obtained by image sensor 64. AE module 76 may evaluate the brightness level of the captured frame using luminance values of the captured frame, and output an indication of the brightness level of the scene based on the analyzed image information. In some examples, AE module 76 may express brightness level in Lux, discussed in more detail below. The raw image information may include, for example, raw luma values for the pixels in a captured frame. AE module 76 may utilize the luma values to provide statistics of luma values within the frame, as described in more detail below. AE module 76 may also provide with a captured frame information regarding brightness in the frame such as, the average frame luma and an exposure index associated with the frame, discussed in more detail below.

Figure 3A:
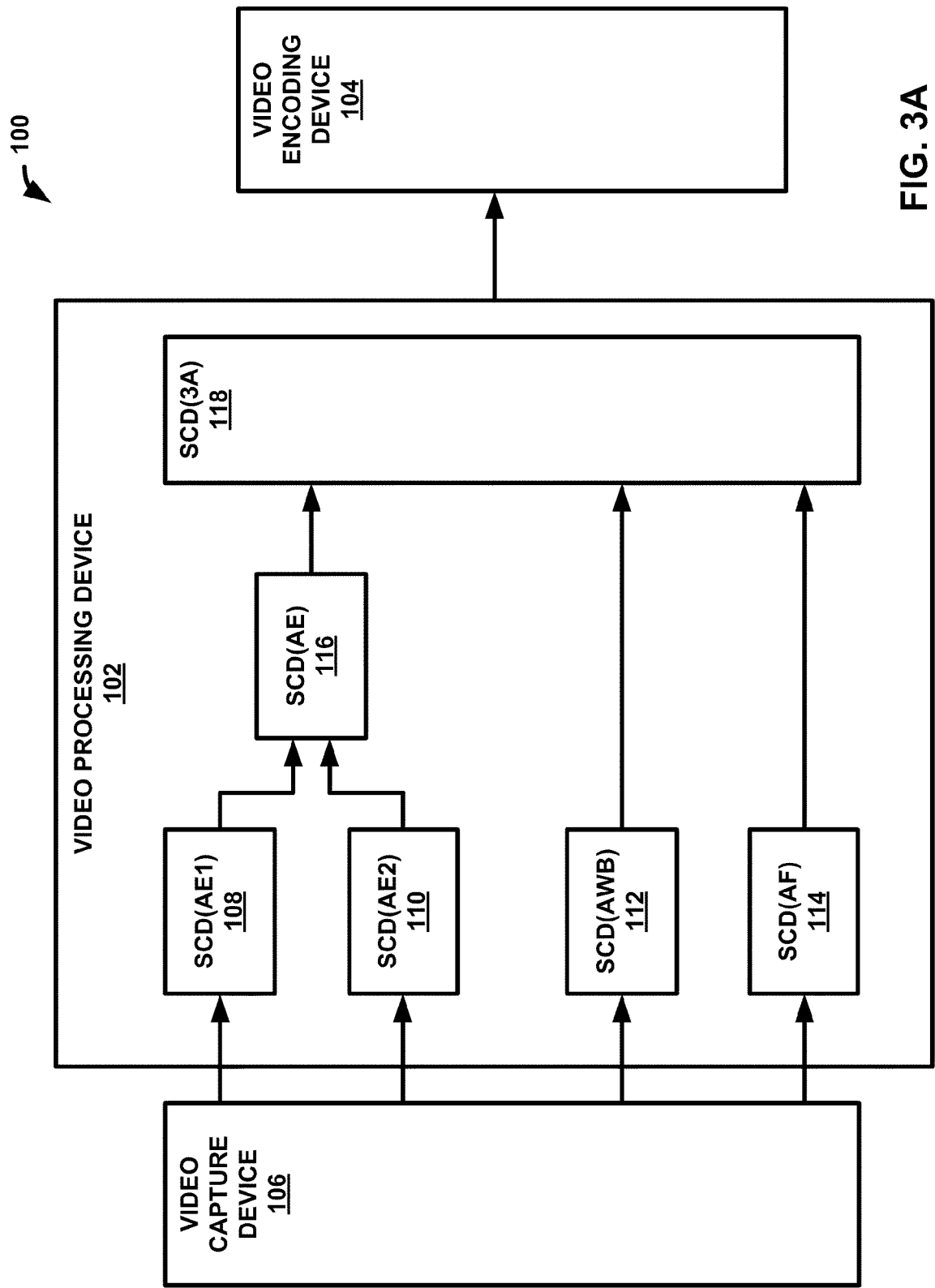
FIG. 3A is a block diagram illustrating an exemplary video capturing and encoding system that implements techniques of this disclosure.

FIG. 3A is a block diagram illustrating an exemplary video capturing and encoding system 100 that implements techniques of this disclosure. As shown in FIG. 3A, system 100 includes a video capture device 106, e.g., video camera, which captures and sends video information to video processing device 102 and video encoding device 104. In one example, video capture device 106 may include similar features to the video capture device of FIG. 2. Video processing device 102 may be a stand-alone processing device, or may be part of either video capture device 106 or video encoding device 104. In one example, video processing device 102 may be a VFE image processor. Video capture device 106 and video encoding device 104 may comprise any of a wide range of devices, including mobile devices. In some examples, video capture device 106, video processing device 102, and video encoding device 104 may be contained in the same enclosure as part of the same system. In other examples, video capture device 106, video processing device 102, and video encoding device 104 may reside in two or more different devices, and may be part of two or more different systems. If video capture device 106, video processing device 102, and video encoding device 104 reside in two or more different devices, data may be exchanged among them by a wired or wireless link. In one example, video capture device 106, video processing device 102, and video encoding device 104 may reside in one device, e.g., a video camera or a camera phone. In one example, video capture device 106 may be part of an image and video capture device, capable of capturing moving and still images.

In the example of FIG. 3A, video processing device may include scene change detection (SCD) units 108, 110, 112, 114, 116, and 118. Video encoding device 104 may be a device or part of a device that encodes video according to a video standard, e.g., H.264/MPEG-4, MPEG-2, or the like. In accordance with this disclosure, video capture device 106 may be configured to capture video frames and obtain parameters associated with the captured video frames. As discussed above, the obtained parameters may be, for example, values associated with the AE, AW, and AF functions. Video capture device 106 may send the obtained parameters to video processing device 102, which may use the obtained parameters to make determinations regarding the captured video frames, e.g., detect scene changes in the captured video frames. Video processing device 102 may send an indication regarding the determinations, e.g., a scene change detection indication, to video encoding device 104. Video encoding device 104 may utilize the scene change indication as a trigger to encode a frame at the scene change as a reference frame for a new GOP, e.g., I frame. For example, if video processing device 102 sends an indication that there was a scene change between frame $F_n$ and the following frame $F_{n+1}$, video encoding device 104 may encode frame $F_{n+1}$ as an I frame and as the first frame of a new GOP.

The video stream captured by video capturing device 106 may include raw video data and statistics, which may be used to determine characteristics of the captured video frames (e.g., scene change) when interpreted by the SCD units of video processing device 102. Changes in a captured frame, such as, for example, changes in the level of brightness, light temperature, and objects in focus, as indicated by parameters associated with the AWB, AE, and AF functions, may trigger video processing device 102 to make a determination such as, for example, a scene change in captured video frames. Information about these parameter changes may not be as readily available at the video encoding device side for analysis. In an example, using parameters associated with captured video frames from video capture device 106 may be useful for real-time scene change detection, as it requires less processing than analyzing captured frames to determine whether a scene change has occurred.

In accordance with example techniques of this disclosure, video processing device 102 may utilize the 3A raw input statistics, where 3A represents the AE, AWB, and AF functions in video capture device 106. The AE, AWB, and AF functions (3A functions) are conventional processes implemented in image and video capturing devices. The 3A functions may, in their ordinary implementation, provide parameters in response to characteristics of captured image and video frames. In one aspect of this disclosure, a video system, e.g., system 100 of FIG. 3A, may utilize the parameters provided by the 3A functions to make determinations (e.g., occurrence of a scene change) regarding the captured video frames.

In one example, video processing device 102 may make a determination regarding scene change based on each of the AWB, AE, and AF function parameters. Video processing device 102 may utilize a scene change detection algorithm for each of the 3A functions. The algorithms may be designed to exploit the characteristics of each of the 3A functions during scene changes. Video processing device 102 may base the combined scene change detection result on a weighted sum of the individual scene change detection results from each of the 3A functions. In terms of the 3A functions, a scene change may occur if, for example, there are significant changes in brightness level, there are significant temperature changes, there are changes in objects in focus, or new objects come into the scene with fast motion.

As shown in FIG. 3A, video processing device 102 may determine whether a scene change has occurred based on each of the 3A functions, and then multiply each decision by a weight value. In one example, the decision regarding whether a scene change has occurred according to each of the 3A functions may be 1 or 0, where 1 may indicate that scene change was detected based on the 3A function value and 0 may indicate that no scene change was detected based on the 3A function value. The weight values may be set to default values at manufacturing, may be altered by user preference, or may be adjusted automatically by the system based on, for example, mode of capture (e.g., daylight, night, sports, etc.), type of scene, brightness, motion level, or the like. In one example, video processing device 102 may generate weighted values for each of the 3A functions for each captured frame. Video processing device 102 may combine the weighted values for scene changes according to each of the 3A functions to determine an overall scene change decision value. Video processing device 102 may compare the overall scene change decision to a threshold value. The threshold value may be set to a default value, may be altered by the user, or may be adjusted automatically by the system. If the overall scene change decision value exceeds the threshold value, video processing device 102 determines that a scene change has occurred. Upon determining occurrence of a scene change, video processing device 102 may send an indication to video encoding device 104, which may indicate that a scene change has occurred from a captured frame $F_n$ to captured frame $F_{n+1}$, thus triggering video encoding device 104 to encode frame $F_{n+1}$ as a reference I frame of a new GOP. In one example, the indication regarding whether a scene change has occurred may be 1 or 0, where 1 may indicate that a detected scene change and 0 may indicate that no scene change was detected.

In one aspect of this disclosure, video processing device 102 may process information from video capture device 106 to determine whether a scene change has occurred based on AE function information. In one example, two methods may be utilized to determine whether AE function data indicates a scene change has occurred. SCD unit 108 and SCD unit 110 may determine scene change according to AE function information using a dynamic threshold technique and a Lux index difference technique, respectively, discussed in more detail below. SCD unit 116 may combine the decisions from SCD unit 108 and SCD unit 110 to output a combined SCD decision based on AE function information.

Figure 3B:
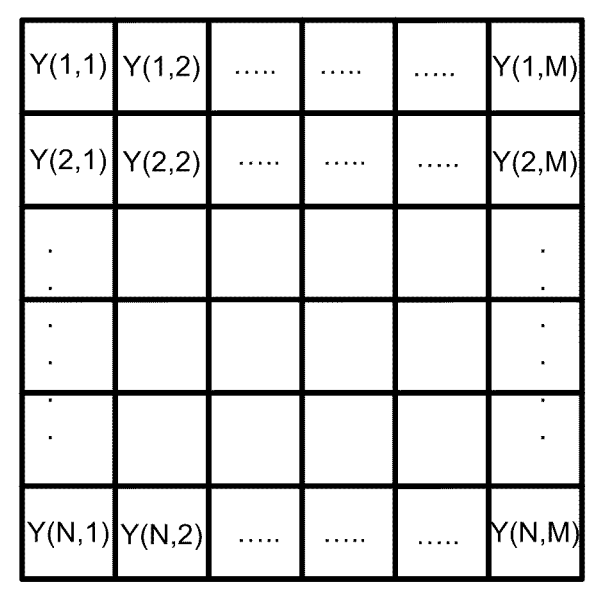

In one example of this disclosure, SCD unit 108 may utilize the dynamic threshold technique to determine whether a scene change has occurred based on data it receives from the AE function in video capture device 106. FIG. 3B illustrates a N×M block of raw luma values of pixels of a captured video frame. The dynamic threshold technique may utilize raw luma sum data of N×M blocks in the captured frames. N and M may be set to default values at manufacturing or may be adjusted by the system automatically or based on user preference. In one example, video capture device 106 may provide 16×16 blocks, for which video processing device 102 may analyze the luma value using the dynamic threshold method. In this method, the sum of the absolute difference (SAD) of luma values between the currently-captured frame ($F_{n+1}$) and the previously-captured frame ($F_n$) may be computed for the 16×16 blocks. SADs for the last K frames may be stored for scene change detection, where K may be a constant set to a default value or may be set by a user to a value deemed appropriate for the application. The SAD value for frame n may be calculated according to the following equation:

$$SAD_n = \sum_{i=0}^{N-1} |Y_n(i) - Y_{n-1}(i)|$$

where N is the total number of 16×16 blocks in each frame, and Y(i) is the average luma value of the corresponding block. The mean M and standard deviation σ of the SAD values of the last K frames may be determined according to the following equation:

$$M_n = \frac{1}{K} \sum_{i=0}^{K-1} SAD_i$$

$$\sigma_n = \sqrt{\frac{1}{K} \sum_{i=0}^{K-1} (SAD_i - M_n)^2}$$

Using the mean and standard deviation of the SAD values for the last K frames, SCD unit 108 may determine a dynamic threshold value as follows:

$$\text{Threshold}_{AEC_n} = e \times M_n + f \times \sigma_n$$

where e and f are weight parameters set to default values, automatically changed by a system, or set by a user. SCD unit 108 may detect a scene change at the current frame if the frame's SAD value is equal to or larger than a predetermined threshold as follows:

$$SAD_n \geq \text{Threshold}_{AEC_n}$$

In one example, SCD unit 108 may output a 1 if a scene change is detected and 0 if a scene change is not detected based on the above comparison.

In one example of this disclosure, SCD unit 110 may utilize a Lux index difference technique to determine whether a scene change has occurred based on data it receives from the AE function in video capture device 106. The Lux index may be a measure of brightness, and may indicate the brightness level for the entire frame at the time of capture. The Lux index difference for detecting scene change based on AE may be calculated by first determining the Lux index for frame n as follows:

$$LuxIndex(n) = ExposureIndex + \frac{1}{\log 10(1.03)} \log 10\left(\frac{LumaTarget \times MaxFrameRate}{CurrentFrameLuma \times CurrentFrameRate}\right)$$

where CurrentFrameLuma may be the average luma value of the current frame. MaxFrameRate may be the maximum rate at which video capture device 106 captures frames, and CurrentFrameRate may be the rate at which video capture device 106 captured the current frame. ExposureIndex may be the speed rating or setting assigned to shooting conditions of video capture device 106, and commonly referred to as ISO, which may be specified by the manufacturer of video capture device, selected by a user from several options, or automatically altered during the video capturing process. LumaTarget is the targeted luma value, which may be used to define a tolerance range of luma values for the frame. When light conditions for the environment change, the AE function may adjust the ExposureIndex to bring the average frame luma to the tolerance range of luma values. In one example, the tolerance range may be defined by the LumaTarget, e.g., [LumaTarget−4, LumaTarget+4]. LumaTarget may automatically change based on lighting conditions, user preference, or may be specified by the manufacturer of the video capture device. Once the average frame luma is within the tolerance range, the AE function stops adjusting the ExposureIndex. Therefore, when a scene change occurs and affects the brightness level of a captured frame, the AE function adjusts the brightness of the frame, and the ExposureIndex and CurrentFrameLuma values change, which results in a change in the LuxIndex of the frame. SCD unit 110 may determine that a scene change has occurred in frame n if the Lux index difference between two consecutive frames is greater than a predefined threshold as follows:

$$|LuxIndex(n) - LuxIndex(n-1)| > Threshold_{Lux}$$

where the threshold may be set to a default value, automatically set by the system, or defined by the user.

In one example, SCD unit 110 may output 1 if a scene change is detected and 0 if a scene change is not detected.

Detection of scene change based on the AE function using the Lux index difference technique may detect brightness level changes in a scene, and may be a strong indication of scene change. Detection of scene change based on AE using the dynamic threshold technique may detect brightness level change in a frame where the change in the overall brightness is less drastic. Using the Lux index difference technique with the dynamic threshold technique may be useful when a scene change occurs, but the overall brightness level does not change drastically. In one example, a frame with an image of a fish under water, the scene may change to a similar scene under water, but with a turtle, instead of the fish. In this example, the overall brightness of the frame may not drastically change, even though a scene change has occurred. Therefore, using the Lux difference technique may not result in detecting a scene change. However, for the same example, using the dynamic threshold technique may result in detecting the scene change, as it looks at brightness on a block-by-block basis within a frame. Therefore, using both techniques, at least one of the techniques may indicate a scene change in this example. In other examples, each of the techniques on its own my not detect the scene change, but a combination of the two techniques may result in detection of the scene change. Therefore, combining the dynamic threshold technique and the Lux difference technique may provide more effective detection of scene changes using AE information.

SCD unit 116 may combine weighted results of SCD unit 108 and SCD unit 110. In one example, SCD unit 116 outputs 1 if either SCD unit 108 or SCD unit 110 outputs 1. In another example, SCD unit 116 outputs 1 if both SCD unit 108 and SCD unit 110 output 1s.

In another aspect of this disclosure, video processing device 102 may process information from video capture device 106 to determine whether a scene change has occurred based on AWB function information. SCD unit 112 may determine scene change based on AWB information. In one example, SCD unit 112 may output 1 if a scene change is detected and 0 if a scene change is not detected.

In one example, SCD unit 112 may base the SCD decision on two most recent grey world AWB decisions. SCD unit 112 may make the SCD decision for grey world AWB based on grey world assumption, which states that, in a given image, the average values of the R (red), G (green), and B (blue) components of the image should average to a common grey value. When there is no scene change in a video sequence, successive frames may have relatively close grey world values. On the other hand, when a scene changes, the frame at the scene change may have a grey world value that is relatively different from the grey world value of the previous frame, i.e., the frame preceding the scene change. In one example, SCD unit 112 may categorize the grey world decisions into one of three clusters: an outdoor cluster (sunlight, cloudy, noon, hybrid); an indoor cluster (warm florescent, cold florescent, custom florescent); and a horizon cluster (incandescent, horizon). The clusters may be organized by color temperature types that are close. For example, the outdoor cluster color temperature types (sunlight, cloudy, noon, and hybrid) may correspond to four different color temperatures, but they can be generally associated with one another because they represent outdoor color temperature types. The indoor cluster color temperature types (warm florescent, cold florescent, and custom florescent) may have different color temperature ranges, but they can be generally associated with one another because they represent indoor color temperature types. Similarly, the horizon cluster color temperature types (incandescent, horizon) may represent different color temperature ranges, but they can be generally associated with one another because they represent horizon colors temperature types. It should be noted that the clusters and color temperature types listed here are exemplary, and more or less clusters and/or color temperature types may be utilized to categorize grey world decisions of frames. In one example, a scene change may correspond to color temperature changes from one type of cluster to another. In one example, SCD unit 112 may detect that scene change has occurred if the most recent grey world AWB cluster decisions are different.

In another aspect of this disclosure, video processing device 102 may process information from video capture device 106 to determine whether a scene change has occurred based on AF function information. SCD unit 114 may determine scene change based on AF information. In one example, SCD unit 114 may output 1 if a scene change is detected and 0 if a scene change is not detected.

In one example, during real-time video recording, when a new object comes into the scene or the user directs the lens at a new object, the auto focus function of video capture device 106 may detect the change and readjust the lens to achieve better focus. During the refocusing process, a scene changes occurs over several frames, and refocus time varies based on the amount of change in the scene and the algorithm for the refocusing process. In one example, SCD unit 114 may perform scene change detection independently from the algorithm that performs the actual refocusing, and may evaluate the overall lens position changes during the refocusing process, e.g., the change in lens position from the beginning of the refocus process until refocus is achieved. SCD unit 114 may set a threshold to use in determining whether a scene change has occurred based on auto focus according to the following equation:

$$\text{Threshold}_{AF} = p|\text{LensFarEnd} - \text{LensNearEnd}|$$

where LensFarEnd may be the maximum position of the lens of the video capture device 106 and LensNearEnd may be the minimum position of the lens. The parameter p may be a tuning parameter set by default, determined by the system, or set by a user. The value of p may, for example, range from 0 to 100%. SCD unit 114 may determine that a scene change has occurred in a frame by comparing the lens position change during the refocus process to the threshold, which is a percentage of the lens range. If the change during refocusing is equal to or greater than the threshold, then SCD unit 114 determines that a scene change has occurred:

$$|\text{LensPosition}[\text{refocus\_start}] - \text{LensPosition}[\text{refocus\_finished}]| \geq \text{Threshold}_{AF}$$

where LensPosition[refocus_start] is the position of the lens when the refocus process begins, and LensPosition[refocus_finished] is the position of the lens when video capture device 106 achieves refocus. In one example, p may be set to 50%, so that the threshold is half of the lens position range. If an auto focus process requires the change of more than half of the lens position range, SCD unit 114 determines that a scene change has occurred. In one example, the range of the lens positions may be determined by the number of steps the lens may go through from the near end to the far end of the lens. In one example, the lens position range may be 36 steps, and where p is 50%, the threshold may be 18 steps. In this example, if a refocus process requires a change of 18 or more steps, then SCD unit 114 indicates occurrence of a scene change. In some examples and/or applications, it may be more effective to set the value of p to a lower percentage, or a higher percentage, depending on user's preference. When p is smaller, scene change based on the AF function is detected more frequently than when p is larger, because the lens position would have to change by fewer steps for a scene change to be detected.

In most cases, refocusing as part of the AF function may happen over several frames. In one example, the refocusing process may last for k frames, during which the frames may be blurry. In one example, video processing device 102 may send to video encoding device 104 an indication of scene change, i.e., an indication to encode a frame as I frame when refocus is reestablished.

According to techniques of this disclosure, as shown in FIG. 3A, SCD unit 118 may combine the outputs of SCD units 116, 112, and 114 as follows:

$$\text{WeightedSCD}(3A) = a \times \text{SCD}(\text{AEC}) + b \times \text{SCD}(\text{AWB}) + c \times \text{SCD}(\text{AF})$$

In one example, SCD(AE)=1 or 0; SCD(AWB)=1 or 0; SCD(AF)=1 or 0. The weights a, b, and c may be set to default values, automatically updated by the system, or set by a user. In one example, a=1; b=1; c=1. The weighted SCD value may be compared to a threshold according to the following equation:

$$\text{WeightedSCD}(3A) \geq q(a+b+c)$$

where q is a normalization factor, which may depend on the values of a, b, and c. In the example where a=b=c=1, q may be set to ⅓. If the weighted SCD value is equal to or greater than the threshold, video processing device 102 sends a scene change indication to video encoding device 104.

In one example, video processing device 102 may perform the scene change detection under the assumption that two consecutive scene changes, i.e., two consecutive I frame triggers, may not occur. Video processing device 102 may set a number of frames, X, as the least number of frames between two scene changes.

Figure 4:
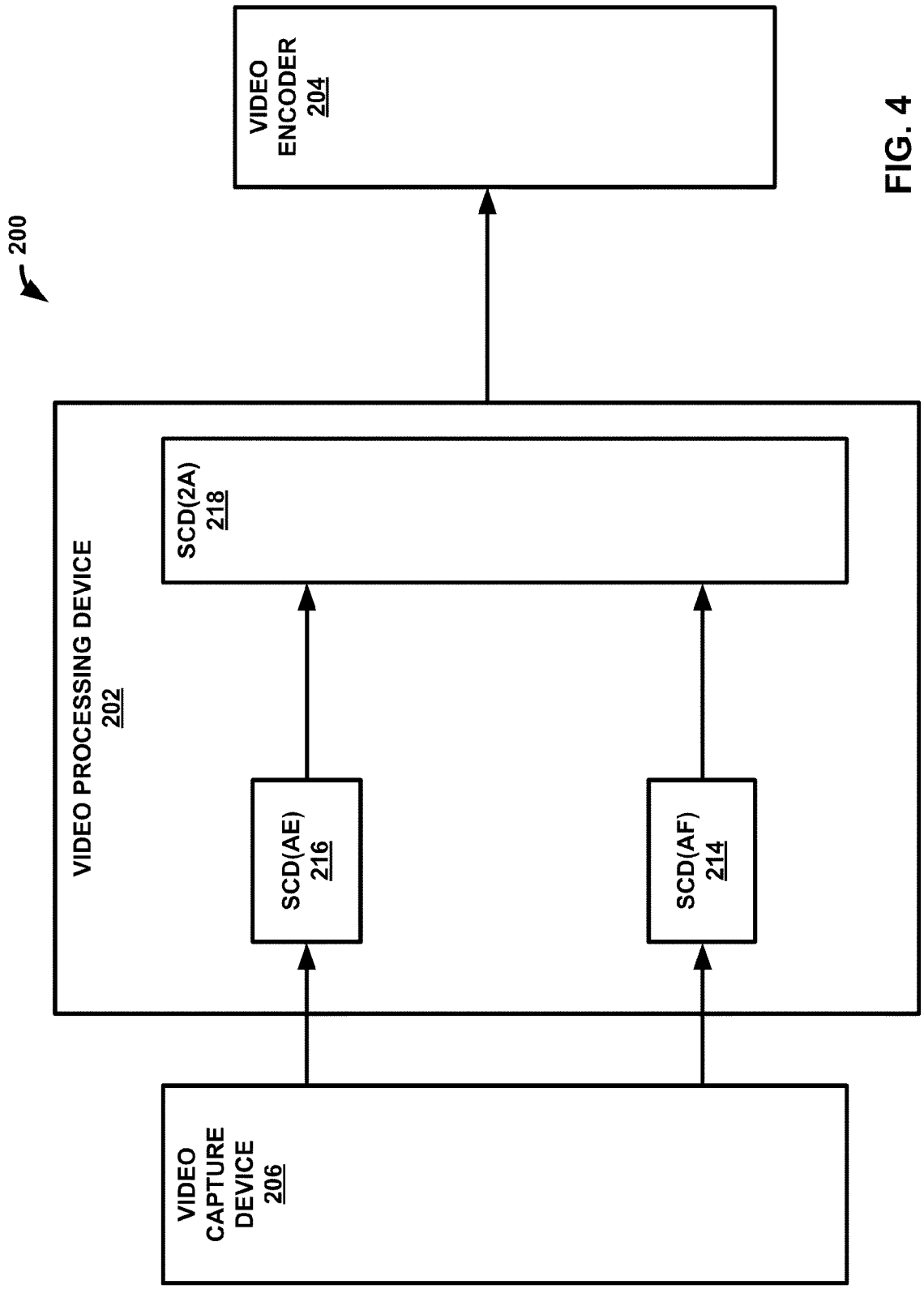
FIG. 4 is a block diagram illustrating another exemplary video capture device and video encoder system that implements techniques of this disclosure.

FIG. 4 is a block diagram illustrating another exemplary video capturing and encoding system 200 that implements techniques of this disclosure. As shown in FIG. 4, system 200 includes a video capture device 206, e.g., video camera, which captures and sends video information to video processing device 202 and video encoding device 204. The devices of system 200 may substantially correspond to the devices of FIG. 3A.

In the example of FIG. 4, video processing device may include scene change detection (SCD) units 214, 216, and 218. Video encoding device 204 may be a device or part of a device that encodes video according to a video standard, e.g., H.264/MPEG-4, MPEG-2, or the like. In accordance with this disclosure, video capture device 206 may be configured to capture video frames and obtain parameters associated with the captured video frames. The example implementation of FIG. 4 may be a simplified version of the example implementation of FIG. 3A, where video processing device 202 uses information from the AE and AF functions to make a determination regarding scene change in captured video frames.

In accordance with example techniques of this disclosure, video capture device 202 may utilize raw input statistics from the AE and AF functions in video capture device 206 to determine whether scene change has occurred in the captured video frames. Video processing device 202 may make a determination regarding scene change based on each of AE and AF functions as described above for FIG. 3A. As shown in FIG. 4, video processing device 202 may multiply the decision regarding scene change based on each of the AE and AF functions by a weight value, as described above. The weight values may be set to default values at manufacturing, may be altered by user preference, or may be adjusted automatically by the system based on, for example, mode of capture (e.g., daylight, night, sports, etc.), type of scene, brightness of scene, motion level, or the like. Video processing device 202 may combine the weighted values for scene changes according to each of the AE and AF functions to determine an overall scene change decision value, and compare the overall scene change decision to a threshold value. The threshold value may be set to a default value, may be altered by the user, or may be adjusted automatically by the system. If the overall scene change decision value exceeds the threshold value, video processing device 202 determines that a scene change has occurred, and send an indication to video encoding device 104 that a scene change has occurred from a captured frame $F_n$ to captured frame $F_{n+1}$, thus triggering video encoding device 204 to encode frame $F_{n+1}$ as a reference I frame of a new GOP. In one example, the indication regarding whether a scene change has occurred may be 1 or 0, where 1 may indicate that a detected scene change and 0 may indicate that no scene change was detected.

SCD units 214 and 216 may implement substantially the same algorithms and carry out substantially the same functionalities as SCD units 114 and 116 of FIG. 3A, as described above. According to techniques of this disclosure, as shown in FIG. 4, SCD unit 218 may combine the outputs of SCD units 214 and 216 according to the following equation:

$$\text{WeightedSCD}(2A) = a \times \text{SCD}(AEC) + b\text{SCD}(AF)$$

where SCD(AE) indicates whether a scene change was detected based on the AE function and SCD(AF) indicates whether a scene change was detected based on the AF function. In one example, SCD(AE)=1 or 0 and SCD(AF)=1 or 0. The weights a and b may be set to default values, updated by the system, or set by a user. In one example, a=1 and b=1. The weighted SCD value may be compared to a threshold as follows:

$$\text{WeighteSCD}(2A) \geq q(a+b)$$

where q is a normalization factor, which may depend on the values of a and b. In the example where a=b=1, q may be set to ½. If the weighted SCD value is equal to or greater than the threshold, video processing device 202 sends a scene change indication to video encoding device 204.

Figure 5:
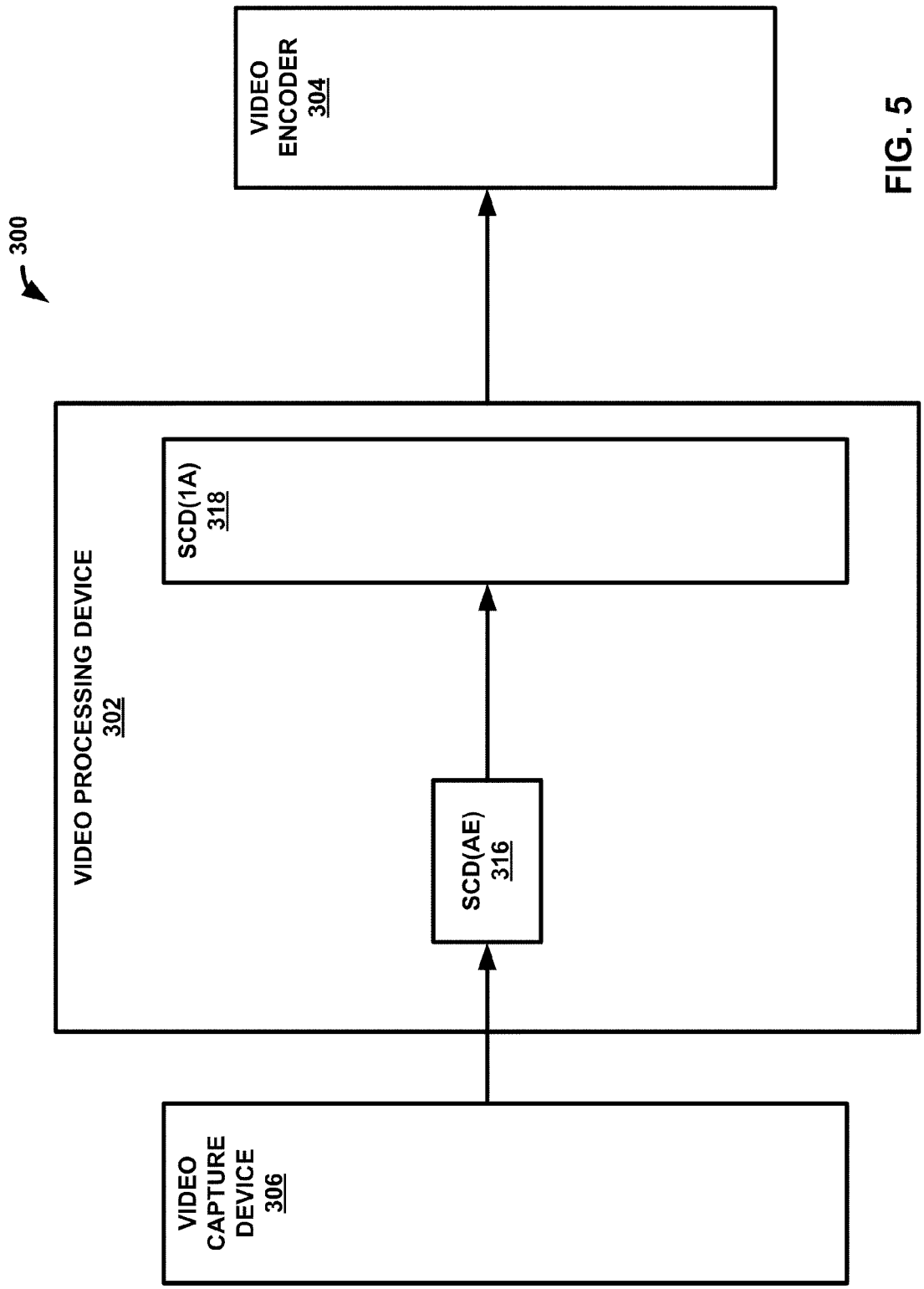
FIG. 5 is a block diagram illustrating another exemplary video capture device and video encoder system that implements techniques of this disclosure.

FIG. 5 is a block diagram illustrating another exemplary video capturing and encoding system 300 that implements techniques of this disclosure. As shown in FIG. 5, system 300 includes a video capture device 306, e.g., video camera, which captures and sends video information to video processing device 302 and video encoding device 304. The devices of system 300 may substantially correspond to the devices of FIG. 3A.

In the example of FIG. 5, video processing device may include scene change detection (SCD) units 316 and 318. Video encoding device 304 may be a device or part of a device that encodes video according to a video standard, e.g., H.264/MPEG-4, MPEG-2, or the like. In accordance with this disclosure, video capture device 306 may be configured to capture video frames and obtain parameters associated with the captured video frames. The example implementation of FIG. 5 may be a simplified version of the example implementations of FIGS. 3A and 4, where video processing device 302 uses information from the AE function to make a determination regarding scene change in captured video frames.

In accordance with example techniques of this disclosure, SCD unit 316 may implement substantially the same algorithms and carry out substantially the same functionalities as SCD unit 116 of FIG. 3A, as described above.

According to techniques of this disclosure, as shown in FIG. 5, SCD unit 318 may interpret the output of SCD unit 316, and if the value indicates a scene change has occurred, video processing device 302 sends a scene change indication to video encoding device 304.

Figure 6:
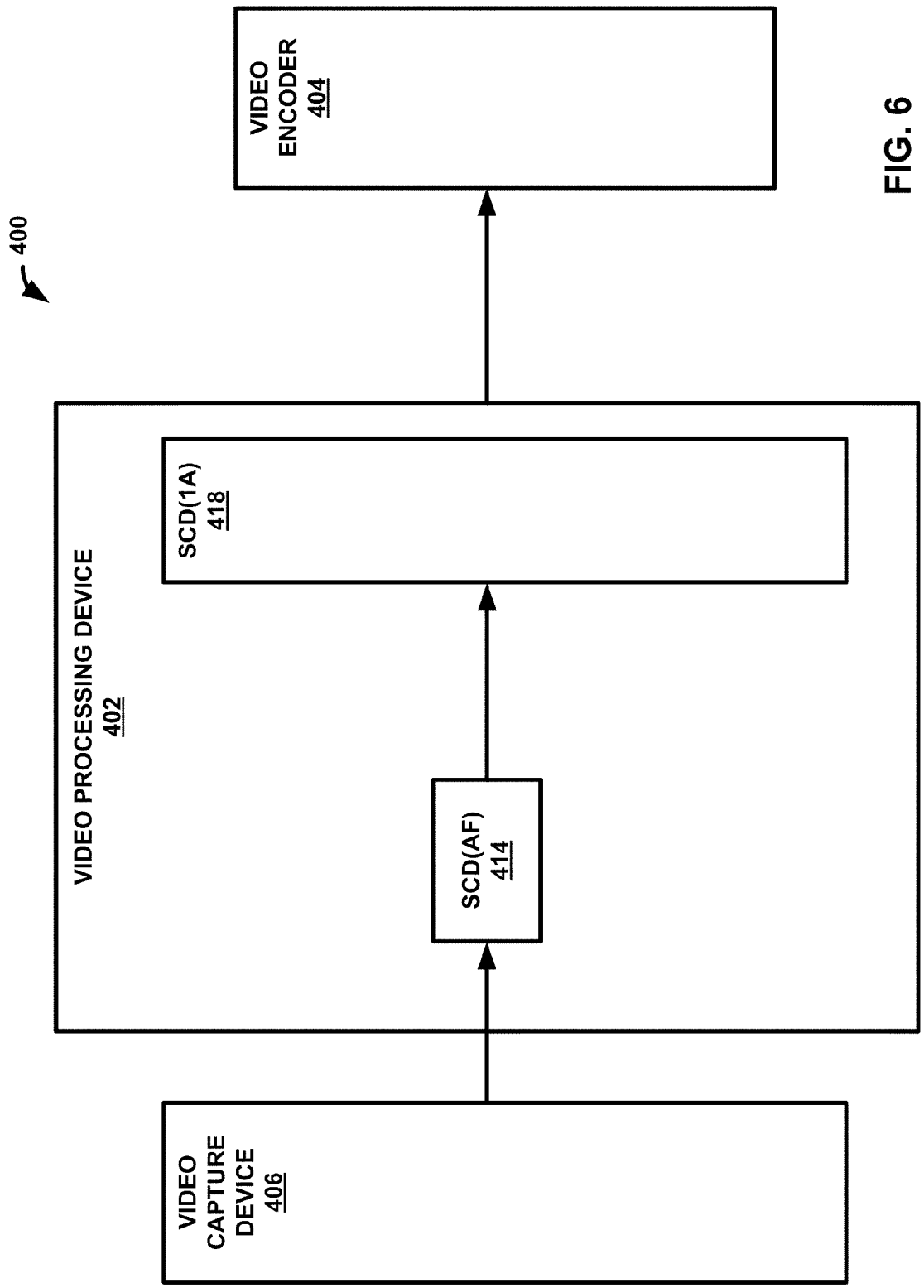
FIG. 6 is a block diagram illustrating another exemplary video capture device and video encoder system that implements techniques of this disclosure.

FIG. 6 is a block diagram illustrating another exemplary video capturing and encoding system 400 that implements techniques of this disclosure. As shown in FIG. 6, system 400 includes a video capture device 406, e.g., video camera, which captures and sends video information to video processing device 402 and video encoding device 404. The devices of system 400 may substantially correspond to the devices of FIG. 3A.

In the example of FIG. 6, video processing device may include scene change detection (SCD) units 414 and 418. Video encoding device 404 may be a device or part of a device that encodes video according to a video standard, e.g., H.264/MPEG-4, MPEG-2, or the like. In accordance with this disclosure, video capture device 406 may be configured to capture video frames and obtain parameters associated with the captured video frames. The example implementation of FIG. 6 may be a simplified version of the example implementations of FIGS. 3A and 4, where video processing device 402 uses information from the AF function to make a determination regarding scene change in captured video frames.

In accordance with example techniques of this disclosure, SCD unit 414 may implement substantially the same algorithms and carry out substantially the same functionalities as SCD unit 114 of FIG. 3A, as described above.

According to techniques of this disclosure, as shown in FIG. 6, SCD unit 418 may interpret the output of SCD unit 414, and if the value indicates a scene change has occurred, video processing device 402 sends a scene change indication to video encoding device 404.

Figure 7:
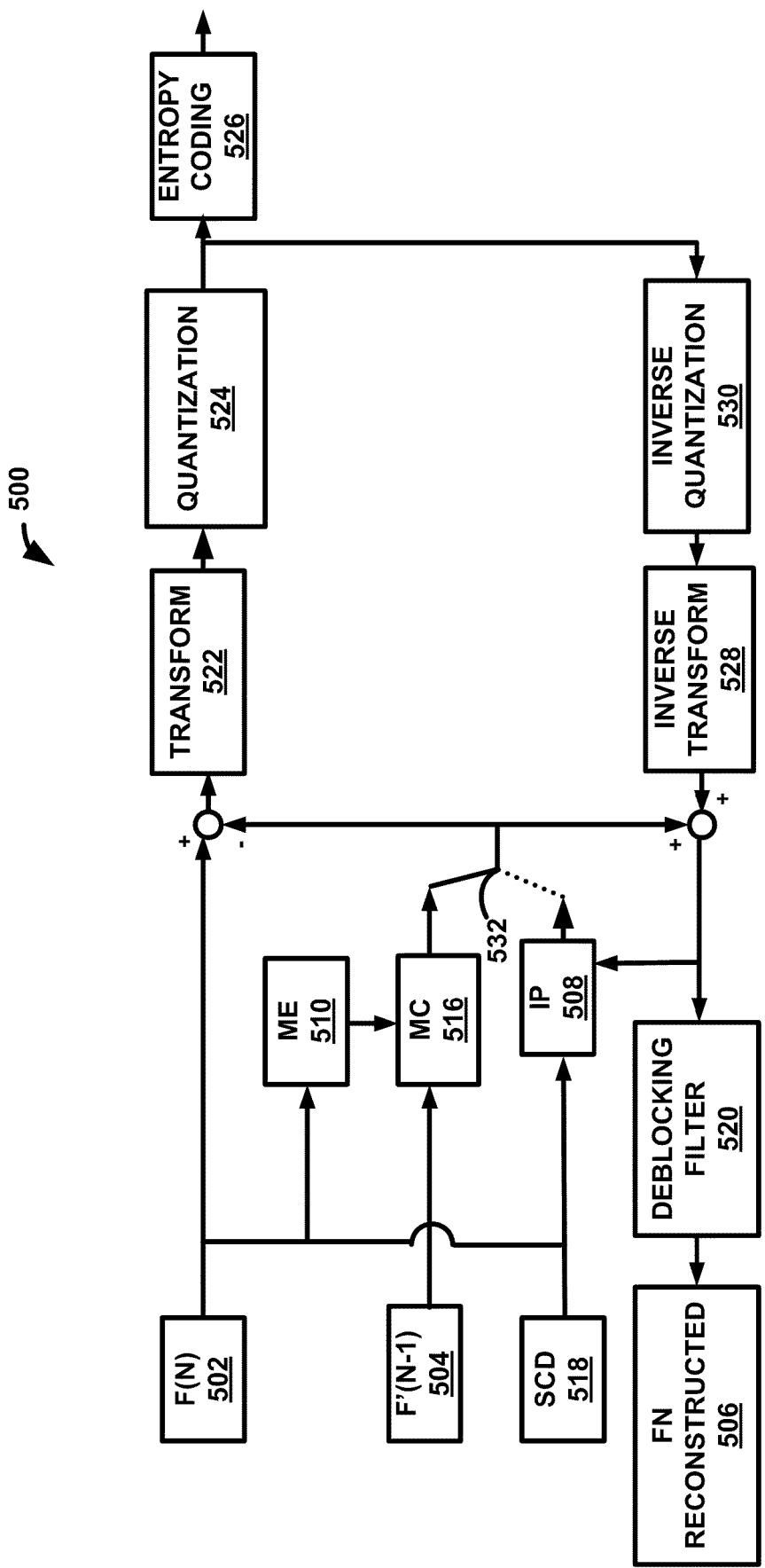
FIG. 7 is a block diagram illustrating an example of a video encoding system that implements techniques of this disclosure.

FIG. 7 is a block diagram illustrating an example of a video encoding system 500 that implements techniques of this disclosure. As shown in FIG. 7, system 500 includes elements of a conventional video encoding device in addition to elements that implement techniques of this disclosure. The video encoding system 500 may encode captured video frames captured by a video capture device, e.g., video capture devices 102, 202, 302, or 402 of FIGS. 3A, 4, 5 and 6, respectively. F(n) 502 represents a current frame that the video encoding device is processing for encoding.

During its normal operation, i.e., while there is no indication of scene change in the video sequence, the video encoding device may perform motion estimation 510 and motion compensation 516 on the current frame. Additionally, the video encoding device may employ inter-frame prediction by identifying GOPs with I, P, and B frames. The video encoding device may also operate in intra-frame mode. Using selector 532, the video encoding device may switch between inter-frame prediction and intra-frame prediction. For example, when a new GOP is identified, the video encoding device may encode the first frame of the GOP using intra-frame prediction.

In one example, the video encoding device may operate in inter-prediction mode. The motion compensation data may be subtracted from the current frame 502 to produce residual data, and the result may undergo a transform in transform unit 522, e.g., discrete cosine transform (DCT), to produce transform coefficients representing the residual data. The transformed frame data, e.g., transform coefficients, may then undergo quantization in quantization unit 524. The quantized frame data may then go through entropy coding unit 526 for further compression. The video encoding device may feed the quantized frame to inverse quantization unit 530 and inverse transform unit 528, and may combine with the result from the inter-frame prediction unit 516, to obtain an unfiltered signal. The unfiltered signal may go through deblocking filter 520, which results in a reconstructed frame, F(n), which may be used as a reference frame for encoding other frames.

In one example, a video capture device may obtain parameters associated with the captured video frames, and provide the obtained parameters to a video processing device. The video processing device may analyze the parameters to make determinations regarding the captured video frames, such as, for example, detecting when a scene change has occurred in the captured video frame, as described above. When the video processing device determines that a scene change has occurred, it sends an indication regarding the scene change to the video encoding device. In accordance with this disclosure, the video processing device may comprise, among other units, a scene change detection (SCD) unit 518 that outputs a signal indicative of a scene change occurrence, e.g., SCD=1 if a scene change has occurred. If the signal the video processing device sends to the video encoding device indicates a scene change has occurred, the video encoding device interprets the indication as a trigger to identify a new GOP, and use the current frame corresponding to the scene change as a reference frame, i.e., I frame for the GOP. In this example, a signal from SCD unit 518 indicating a scene change may indicate a scene change had occurred between the previous frame, $F_{n-1}$ and the current frame, $F_n$, therefore, indicating the current frame $F_n$ as the first frame of a new GOP. The video encoding device may encode the current frame $F_n$ as a reference I frame, in a new GOP. In this manner, the video encoding device does not have added computational complexity to determine whether a frame it receives from video capture device is a frame at a scene change and whether to encode a new GOP with a new I frame. Instead, video encoding device simply receives a trigger to use a received frame as an I frame, without having to make the determination regarding the scene change using the resources of the video encoding device.

The signal from SCD unit 518 may control selection 532 between inter mode and intra mode for prediction, when the signal is, for example, 1, i.e., indicating that a scene change has occurred, intra-prediction is enabled, otherwise, inter-prediction is enabled. The video encoding device may perform motion estimation 510 and intra prediction 508 on the current frame that has been designated as a reference I frame. The prediction data may be subtracted from the current frame 502 to produce residual data, and the result may undergo a transform in transform unit 522, e.g., discrete cosine transform (DCT), to produce transform coefficients representing the residual data. The transformed frame data, e.g., transform coefficients, may then undergo quantization in quantization unit 524. The quantized frame data may then go through entropy coding unit 526 for further compression. The video encoding device may feed the quantized frame to inverse quantization unit 530 and inverse transform unit 528, and may combine with the result from the inter-frame prediction unit 516, to obtain an unfiltered signal. The unfiltered signal may go through deblocking filter 520, which results in a reconstructed frame, F(n), which may be used as a reference frame for encoding other frames.

Using techniques of this disclosure, a video processing device may determine occurrence of scene changes using information regarding captured video frames obtained by a video capture device. The information may be raw data associated with functions such as, AE, AWB, and AF, which may not be available at the video encoder. Using the scene change detection methods described above, scene changes may be detected by the video processing device using information obtained by a front end device, i.e., a the video capture device. As a result, the back end of the media system, i.e., the video encoding device, need not implement scene detection algorithms, thus reducing additional computational complexity. The determination of the scene change according to the techniques described above may involve simple mathematical operations on readily available raw input data, and therefore, adds little complexity to the front end of the system, and can be relatively done in real-time.

In one example, the video processing device may determine individual SCD(AE), SCD(AWB), SCD(AF) decisions, which the video processing device may send to a video encoding device to indicate the different types of the scene changes. In some examples, individual scene change indicators may be also useful for the video encoding device to be aware of the type of scene change and adjust the video encoding parameters or processing methods accordingly. In one example, by receiving the individual change scene indicators, the video encoding device may be aware of the scene change type and may implement encoding algorithms that exploit the type of scene change in a particular frame. For example, the video encoding device may utilize the SCD(AF) decision to implement algorithms associated with the refocusing process. In this example, the video encoding device may determine that frames may be blurry during the refocusing process and may adjust the encoding process for these frames by applying a smaller bit rate and simplifying some of the encoding algorithms, for example.

In one example, the computation of algorithms of the disclosure may be low in MIPS as the statistics associated with the AE, AWB, and AF functions have been processed the corresponding modules in the video capture device. As a result fewer additional computations may be needed for determination of scene change based on AWB, for example. Similarly, for detection of scene change based on AF, a simple subtraction may be needed to compute the lens position difference. For detection of scene change based on AE, the computation of sums, means, and standard deviations may be simple and straight forward, and may not add too much computational complexity to the overall system. In an example, some of these computations may be done in the video processing device, which may be separate from the video encoding device, therefore, resulting in fewer computations for the video encoding device to perform. As a result, fewer computations in the video encoding device may reduce computational complexity and may limit delays in the video encoding device as well.

Figure 8:
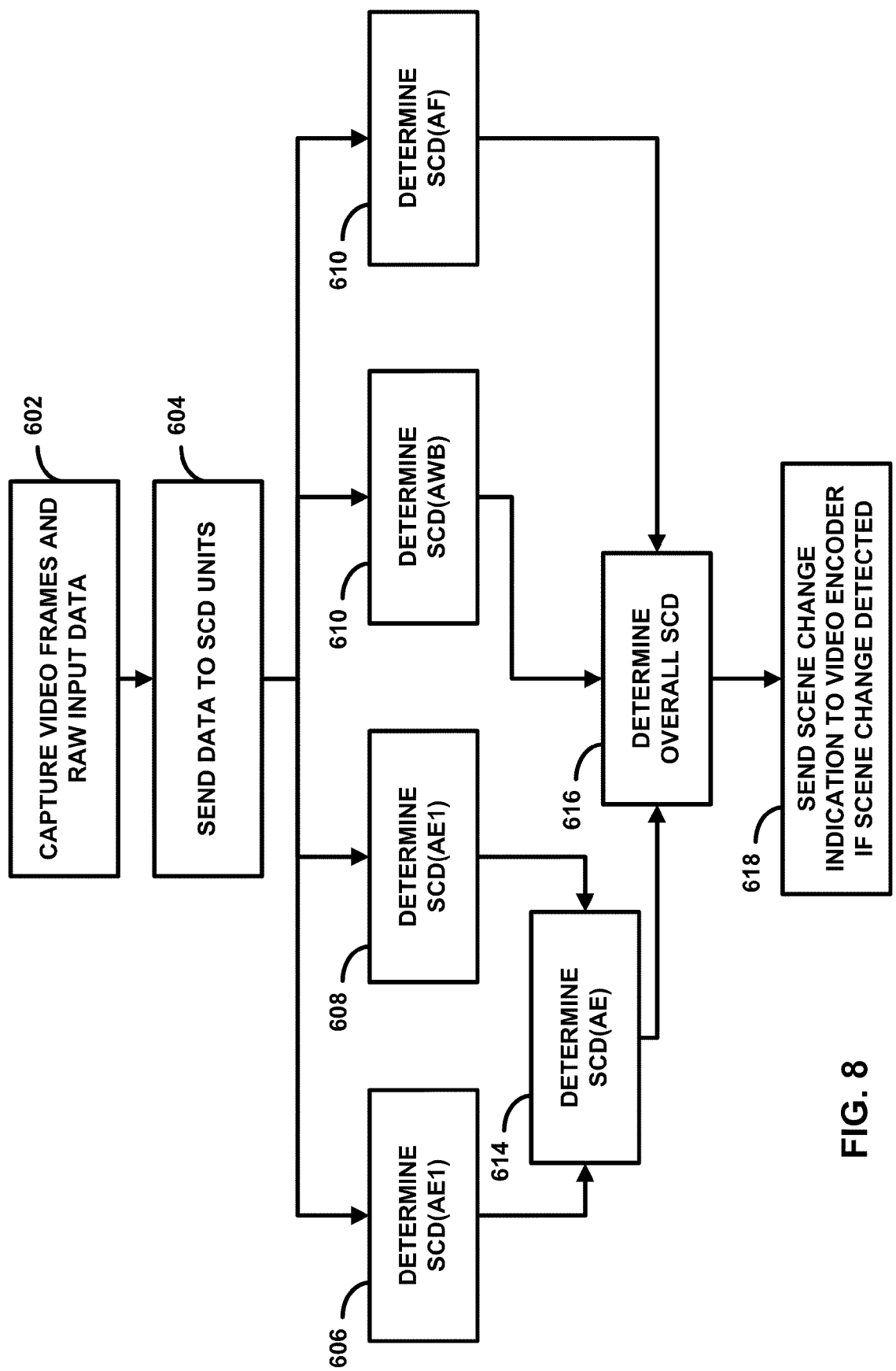
FIG. 8 is a flow diagram illustrating video encoding using scene change detection in accordance with techniques of this disclosure.

FIG. 8 is a flow diagram illustrating video encoding using scene change detection in accordance with techniques of this disclosure. The process of FIG. 8 could be performed in a video system by a front-end device, e.g., a video capture device or video camera, and a back-end device, e.g., a video encoding device or video encoder, and a video processing device, which may be a stand-alone device or may be integrated into either the front-end or back-end devices.

As shown in FIG. 8, a video capture device may be capturing frames and sending them to a video encoding device. The video capture device may generate statistics data associated with captured video functions and related to characteristics of the captured video frames (602). Some characteristics or properties of the captured video frames may include AE, AWB, and AF functions, also referred to as 3A functions. A video processing device may utilize the raw input data to determine whether a scene change has occurred in the video stream. Scene changes in a captured frame may be, for example, changes in the level of brightness, changes in light temperature, changes of objects in focus in the frame, or change of the scene within the frame.

In one example, the video capture device may send the 3A functions statistics data to scene change detection (SCD) units, which may be in the video processing device (604). Each of the SCD units may then make a determination based on each of the input data characteristics of the captured video frames. In one example, the determination may be whether a scene change has occurred in the captured video frames.

In one aspect of this disclosure, the video processing device may process data obtained by the video capture device to determine whether a scene change has occurred based on AE function information. Determining SCD based on AE may utilize two techniques: a dynamic threshold technique and a Lux difference technique. One SCD unit may determine whether a scene change has occurred using the dynamic threshold technique (606), which assesses change in brightness using raw luma sum data of blocks within a frame, as described in detail above. Another SCD unit may determine whether a scene change has occurred using the Lux difference technique (608), which assesses change in the overall brightness of a frame, as described in detail above. The determination whether a scene change has occurred may be quantified. For example, if using the Lux difference technique, the corresponding SCD unit may determine that a scene change has occurred, SCD(AE2) may be set to 1, otherwise, it may be set to 0. Using the results of both techniques, an SCD unit for the AE function may combine the two results to determine whether a scene change has occurred in the frame based on changes in brightness (614).

In another aspect of this disclosure, the video processing device may utilize another SCD unit to process data obtained by video capture device and determine whether a scene change has occurred based on AWB function information (610), as described in more detail above. The SCD unit for determining scene change based on AWB function data may use data directly from the video capture device to make the determination, as the SCD decision based on AWB may be based on grey world information, which may be generated at the time of capturing the video frames.

In another aspect of this disclosure, the video processing device may utilized another SCD unit to process data obtained by video capture device to determine whether a scene change occurred based on AF function information (612), as described in detail above. Often, when a scene change occurs in a video stream, new objects come into the frame, or the scene completely changes, causing the frame to go out of focus and triggering a refocusing process. Refocusing generally involves a change in the lens position. The SCD unit may use lens position change information, for example, between the lens position before refocusing started and the lens position after refocusing was achieved, to determine whether scene change has occurred.

The video processing unit may combine the results of the three SCD units based on the AE, AWB, and AF functions to determine based on all three whether a scene change has occurred in a frame (616). In one example, the overall SCD decision may be based on two or one of the characteristics. For example, the overall SCD decision may be based on AE and AF functions information. In another example, the overall SCD decision may be based on AE function information alone or AF function information alone. Using fewer characteristics may further simplify the decision process.

The video processing device may determine based on the overall SCD decision whether to send an indication regarding scene change to the video encoding device. In one example, if the decision is that no scene change has occurred, the video capture device may simply send the frame to the video encoding device, which encodes the frame according to the video encoding device's normal operation. In another example, if the decision is that scene change has occurred, the video processing device may send an indication to the video encoding device indicating a scene change has occurred (618). The video encoding device may interpret an indication of scene change as a trigger to encode the frame identified as the first frame in a new scene as a reference I frame for a new GOP.

The techniques described in this disclosure may be utilized in a device to assist in the functionalities of a video encoding device, or may be utilized separately as required by the device and the applications for which the device may be used.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware, firmware, and/or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause one or more programmable processors, or other processors, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

In an exemplary implementation, techniques described in this disclosure may be performed by a digital video coding hardware apparatus, whether implemented in part by hardware, firmware and/or software.

Various aspects and examples have been described. However, modifications can be made to the structure or techniques of this disclosure without departing from the scope of the following claims.

The invention claimed is:
1. A method comprising:
obtaining one or more video capture parameters associated with captured video frames, wherein the one or more video capture parameters comprise an automatic exposure parameter, an automatic focus parameter, and an automatic white-balance parameter;
calculating a first scene change detection result based on the automatic exposure parameter;
calculating a second scene change detection result based on the automatic focus parameter;
calculating a third scene change detection result based on the automatic white-balance parameter;
calculating an overall scene change decision value based on a weighted sum of the first scene change detection result, the second scene change detection result, and the third scene change detection result;
detecting a scene change in the captured video frames if the overall scene change decision value exceeds a threshold value; and encoding the captured video frames based on the detected scene change.

2. The method of claim 1, wherein obtaining the one or more video capture parameters comprises obtaining the one or more video capture parameters in a video capture device that captured the video frames.

3. The method of claim 2, wherein detecting the scene change comprises detecting the scene change in the video capture device.

4. The method of claim 1, wherein encoding the captured video frames comprises encoding the captured video frames in a video encoding device, and detecting the scene change comprises detecting the scene change in the video encoding device based on the one or more video capture parameters.

5. The method of claim 1, wherein the one or more video capture parameters comprises an automatic exposure parameter, wherein the automatic exposure parameter indicates a change in brightness between at least two of the captured video frames, and wherein detecting the scene change comprises detecting the scene change if the change in brightness of the at least two captured video frames exceeds a threshold value.

6. The method of claim 5, wherein the automatic exposure parameter indicates at least one of a change in average brightness of the at least two of the captured video frames and a change in block-level brightness of the at least two of the captured video frames.

7. The method of claim 1, wherein the one or more video capture parameters comprises an automatic focus parameter, wherein the automatic focus parameter indicates a position of a lens associated with one of the captured video frames, and wherein detecting the scene change comprises:
determining an amount of change in the lens position of at least two of the captured video frames;
comparing the amount of change with a range value associated with the lens; and
detecting the scene change if the amount of change exceeds the range value.

8. The method of claim 1, wherein the one or more video capture parameters comprises an automatic white balance parameter, wherein the automatic white balance parameter indicates a white balance category of one of the captured video frames, wherein detecting the scene change comprises:
comparing the white balance categories of at least two of the captured video frames; and
detecting the scene change if the white balance categories are different.

9. The method of claim 1, wherein encoding the captured video frames comprises encoding a reference I frame when the scene change is detected.

10. A device comprising:
a video capture device that obtains one or more video capture parameters associated with captured video frames, wherein the one or more video capture parameters comprise an automatic exposure parameter, an automatic focus parameter, and an automatic white-balance parameter;
a processor configured to
calculate a first scene change detection result based on the automatic exposure parameter,
calculate a second scene change detection result based on the automatic focus parameter,
calculate a third scene change detection result based on the automatic white-balance parameter,
calculate an overall scene change decision value based on a weighted sum of the first scene change detection result, the second scene change detection result, and the third scene change detection result, and
detect a scene change in the captured video frames if the overall scene change decision value exceeds a threshold value; and
a video encoder device that encodes the captured video frames based on the detected scene change.

11. The device of claim 10, wherein the processor resides in the video capture device.

12. The device of claim 10, wherein the processor resides in the video encoder device.

13. The device of claim 10, wherein the one or more video capture parameters comprises an automatic exposure parameter, wherein the automatic exposure parameter indicates a change in brightness between at least two of the captured video frames, and wherein detecting the scene change comprises detecting the scene change if the change in brightness of the at least two captured video frames exceeds a threshold value.

14. The device of claim 13, wherein the automatic exposure parameter indicates at least one of a change in average brightness of the at least two of the captured video frames and a change in block-level brightness of the at least two of the captured video frames.

15. The device of claim 10, wherein the one or more video capture parameters comprises an automatic focus parameter, wherein the automatic focus parameter indicates a position of a lens associated with one of the captured video frames, and wherein detecting the scene change comprises:
determining an amount of change in the lens position of at least two of the captured video frames;
comparing the amount of change with a range value associated with the lens; and
detecting the scene change if the amount of change exceeds the range value.

16. The device of claim 10, wherein the one or more video capture parameters comprises an automatic white balance parameter, wherein the automatic white balance parameter indicates a white balance category of one of the captured video frames, wherein detecting the scene change comprises:
comparing the white balance categories of at least two of the captured video frames; and
detecting the scene change if the white balance categories are different.

17. The device of claim 10, wherein encoding the captured video frames comprises encoding a reference I frame when the scene change is detected.

18. A computer-readable medium storing instructions for causing a programmable processor to:
obtain one or more video capture parameters associated with captured video frames, wherein the one or more video capture parameters comprise an automatic exposure parameter, an automatic focus parameter, and an automatic white-balance parameter;
calculate a first scene change detection result based on the automatic exposure parameter;
calculate a second scene change detection result based on the automatic focus parameter;
calculate a third scene change detection result based on the automatic white-balance parameter;
calculate an overall scene change decision value based on a weighted sum of the first scene change detection result, the second scene change detection result, and the third scene change detection result;
detect a scene change in the captured video frames if the overall scene change decision value exceeds a threshold value; and encode the captured video frames based on the detected scene change.

19. The computer-readable medium of claim 18, wherein the instructions to obtain the one or more video capture parameters comprise instructions to obtain the one or more video capture parameters in a video capture device that captured the video frames.

20. The computer-readable medium of claim 19, wherein the instructions to detect the scene change comprise instructions to detect the scene change in the video capture device.

21. The computer-readable medium of claim 18, wherein the instructions to encode the captured video frames comprise instructions to encode the captured video frames in a video encoding device, and the instructions to detect the scene change comprise instructions to detect the scene change in the video encoding device based on the one or more video capture parameters.

22. The computer-readable medium of claim 18, wherein the one or more video capture parameters comprises an automatic exposure parameter, wherein the automatic exposure parameter indicates a change in brightness between at least two of the captured video frames, and wherein the instructions to detect the scene change comprise instructions to detect the scene change if the change in brightness of the at least two captured video frames exceeds a threshold value.

23. The computer-readable medium of claim 22, wherein the automatic exposure parameter indicates at least one of a change in average brightness of the at least two of the captured video frames and a change in block-level brightness of the at least two of the captured video frames.

24. The computer-readable medium of claim 18, wherein the one or more video capture parameters comprises an automatic focus parameter, wherein the automatic focus parameter indicates a position of a lens associated with one of the captured video frames, and wherein the instructions to detect the scene change comprise instructions to:
  determine an amount of change in the lens position of at least two of the captured video frames;
  compare the amount of change with a range value associated with the lens; and
  detect the scene change if the amount of change exceeds the range value.

25. The computer-readable medium of claim 18, wherein the one or more video capture parameters comprises an automatic white balance parameter, wherein the automatic white balance parameter indicates a white balance category of one of the captured video frames, wherein the instructions to detect the scene change comprise instructions to:
  compare the white balance categories of at least two of the captured video frames; and
  detect the scene change if the white balance categories are different.

26. The computer-readable medium of claim 18, wherein instructions to encode the captured video frames comprise instructions to encode a reference I frame when the scene change is detected.

27. A device comprising:
  means for obtaining one or more video capture parameters associated with captured video frames, wherein the one or more video capture parameters comprise an automatic exposure parameter, an automatic focus parameter, and an automatic white-balance parameter;
  means for calculating a first scene change detection result based on the automatic exposure parameter;
  means for calculating a second scene change detection result based on the automatic focus parameter;
  means for calculating a third scene change detection result based on the automatic white-balance parameter;
  means for calculating an overall scene change decision value based on a weighted sum of the first scene change detection result, the second scene change detection result, and the third scene change detection result;
  means for detecting a scene change in the captured video frames if the overall scene change decision value exceeds a threshold value; and
  means for encoding the captured video frames based on the detected scene change.

28. The device of claim 27, wherein the means for obtaining the one or more video capture parameters comprises means for obtaining the one or more video capture parameters in a video capture device that captured the video frames.

29. The device of claim 28, wherein the means for detecting the scene change comprise means for detecting the scene change in the video capture device.

30. The device of claim 27, wherein the means for encoding the captured video frames comprises means for encoding the captured video frames in a video encoding device, and the means for detecting the scene change comprises means for detecting the scene change in the video encoding device based on the one or more video capture parameters.

31. The device of claim 27, wherein the one or more video capture parameters comprises an automatic exposure parameter, wherein the automatic exposure parameter indicates a change in brightness between at least two of the captured video frames, and wherein the means for detecting the scene change comprises means for detecting the scene change if the change in brightness of the at least two captured video frames exceeds a threshold value.

32. The device of claim 31, wherein the automatic exposure parameter indicates at least one of a change in average brightness of the at least two of the captured video frames and a change in block-level brightness of the at least two of the captured video frames.

33. The device of claim 27, wherein the one or more video capture parameters comprises an automatic focus parameter, wherein the automatic focus parameter indicates a position of a lens associated with one of the captured video frames, and wherein the means for detecting the scene change comprises:
  means for determining an amount of change in the lens position of at least two of the captured video frames;
  means for comparing the amount of change with a range value associated with the lens; and
  means for detecting the scene change if the amount of change exceeds the range value.

34. The device of claim 27, wherein the one or more video capture parameters comprises an automatic white balance parameter, wherein the automatic white balance parameter indicates a white balance category of one of the captured video frames, wherein the means for detecting the scene change comprises:
  means for comparing the white balance categories of at least two of the captured video frames; and
  means for detecting the scene change if the white balance categories are different.

35. The device of claim 27, wherein the means for encoding the captured video frames comprise means for encoding a reference I frame when the scene change is detected.

* * * * *